(12) United States Patent
Webster et al.

(10) Patent No.: US 9,772,613 B1
(45) Date of Patent: Sep. 26, 2017

(54) SYSTEM AND METHOD FOR SETTING MOODS AND EXPERIENCES THROUGH USE OF A MOBILE DEVICE

(71) Applicants: David Webster, Morrisville, NC (US); Ryan Corbin, Morrisville, NC (US); Manjiri Kshirsagar, Morrisville, NC (US); John Anderson, Morrisville, NC (US)

(72) Inventors: David Webster, Morrisville, NC (US); Ryan Corbin, Morrisville, NC (US); Manjiri Kshirsagar, Morrisville, NC (US); John Anderson, Morrisville, NC (US)

( * ) Notice: Subject to any disclaimer, the term of this patent is extended or adjusted under 35 U.S.C. 154(b) by 0 days.

(21) Appl. No.: 15/180,187

(22) Filed: Jun. 13, 2016

Related U.S. Application Data

(63) Continuation-in-part of application No. 15/082,268, filed on Mar. 28, 2016.

(51) Int. Cl.
*H04B 1/38* (2015.01)
*G05B 15/02* (2006.01)
*H04L 12/28* (2006.01)

(52) U.S. Cl.
CPC .......... *G05B 15/02* (2013.01); *H04L 12/2816* (2013.01); *H04L 12/2829* (2013.01)

(58) Field of Classification Search
USPC ......................................................... 455/557
See application file for complete search history.

(56) References Cited

U.S. PATENT DOCUMENTS

| | | | |
|---|---|---|---|
| 2015/0120000 A1* | 4/2015 | Coffey | ................ H04L 12/2803 700/13 |
| 2015/0370272 A1* | 12/2015 | Reddy | .................... G05B 15/02 700/278 |
| 2016/0047565 A1* | 2/2016 | Robinson | ............ H04L 12/2803 700/278 |
| 2016/0286630 A1* | 9/2016 | Witzgall | ................. F21S 6/002 |

* cited by examiner

*Primary Examiner* — Fayyaz Alam
(74) *Attorney, Agent, or Firm* — John L Sotomayor

(57) ABSTRACT

This document presents a system and method for defining and controlling moods and experiences associated with one or more spaces within a residential or commercial property. Moods and experiences may be defined by the user to present specified settings for audio, lighting, security, or other parameters that contribute to a mood for a given space. Timing and triggers may be created and saved with the moods and experiences to permit automatic, delayed, and cascading ambiance settings for one or more spaces.

18 Claims, 10 Drawing Sheets

SYSTEM AND METHOD FOR SETTING MOODS AND EXPERIENCES THROUGH USE OF A MOBILE DEVICE

PRIORITY CLAIM

This Non-Provisional application claims under 35 U.S.C. §120, the benefit of priority as a Continuation-in-Part to the Non-Provisional application Ser. No. 15/082,268, filed Nov. 25, 2015 titled "System and Method for Setting Moods and Experiences in a Space" which is hereby incorporated by reference in its entirety.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

This innovation relates generally to the home automation market. In a home automation system, many different electrical and mechanical elements can be controlled via electrical connection into one or more electrical circuits. Many times, a user may wish to control these elements synchronously via a single action such as selecting a switch or pressing a button. An electrical circuit may be configured to activate and deactivate a multitude of devices providing light, audio, temperature control, security control and any other functions that an owner of a property may wish to have under automated control.

Home automation may also consist of input and decision control such that timers and other delay devices may be employed to activate circuit control when an owner is not present. Configuring a home automation system may include the attachment of a decision execution device such as a computer processor connected to the input of the electrical circuit to process actions associated with decisions desired by the home owner.

Configuring desirable settings for an automatic setup may include pre-established user settings associated with particular locations or spaces. Pre-established user settings may be entered into the control system to be recalled automatically at any time a user may choose to achieve the desired result.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which.

DETAILED DESCRIPTION

Figure 1:
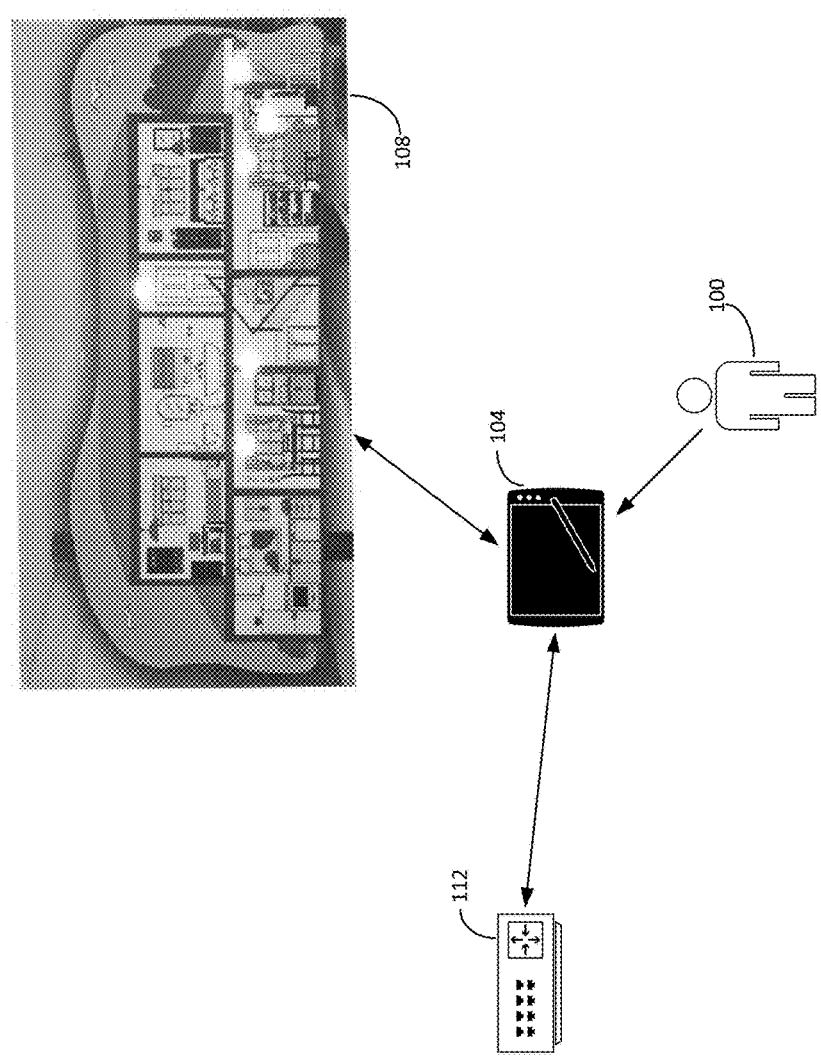
FIG. 1 is a view of a system component configuration consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

Reference throughout this document to "mobile device" refers to any handheld device such as, but not limited to, a smart phone, tablet, iPad, networked computer, internet computer, watch or any other device a user may carry when travelling from place to place and interact with one or more networks.

Reference throughout this document to a "mood" refers to capturing the state of all audio, visual, multimedia, and other elements that contribute to a particular ambient experience in a given space.

Reference throughout this document to an "experience" refers to capturing a collection of defined moods for a variety of spaces where each mood in each space defined for an experience is initiated with the selection and initiation of the experience.

In an exemplary embodiment, an action is defined in this embodiment as a single state change of a particular element contained within a home automation system. Actions include, but are not limited to, turning a light on or off, stopping or starting music, changing the volume of a music playback, setting temperature and environmental controls, setting timers, controlling security systems, and other similar actions a user might take in their home to control one or more devices that contributes to a mood or an experience.

In an embodiment, the implementation of a mood begins with the selection of a space, either interior or exterior, and within that space the user may select all elements in the state that the user has determined may contribute to the mood the user wishes to define. With all selected elements in the state desired, the user captures all of the element settings within the selected space by selecting a "capture mood" selection button on a display, and associate this data capture with a mood. The mood is thus defined for the selected space. Additionally, a user may actively modify content for all elements as part of the save/real-time update upon mood capture. Not all elements within a selected space are required to be included in the mood definition and capture; a subset of the available elements in any space may be utilized to create a mood. A user may select additional spaces, select all desired elements within that space, create settings for each selected element, and capture this information as a mood for each additional space.

In this exemplary embodiment, the elements to be controlled may be electrically connected to one or more wired or wireless connections. The wired connections may be present to provide power and/or control signals, and the wireless connection may operate in conjunction with a wired electrical connection to provide configuration, command, and control signals. Each device connected to the system may have wired, wireless, or both types of electrical and control connectivity. In this exemplary embodiment, configuration and control instructions may be input to the system through a mobile application that may generally be provided for the user as a control entry mechanism. The mobile application may be downloaded to a smartphone, tablet, internet computer, or any other device containing a processor and the two-way communication necessary to connect with the Internet. The application may be downloaded from a central processing hub that serves as the command and control manager for the system. The elements to be controlled may be connected to the central hub via a wired or wireless connection as demonstrated in an associated example system diagram.

In an exemplary embodiment, to activate a mood, a user may be presented with a list of moods where the name or other identifier of each mood is presented as a control button to the user on a screen display of a mobile device, and moods and experiences may be triggered by a mobile device, computer, trigger, timer, light switch button presses, and other means. The control button may serve as a trigger for the named mood associated with the control button. A trigger may be assigned to a day and/or time to schedule the activation or deactivation of a mood. Triggers may be presented to a user on a mood page related to each space for which a mood has been created. Moods may be activated manually from the mood page for the space. Additionally, time frames for the activation of one or more moods may be specific calendar dates, specific times of the day, or may have a more dynamic and less objective timing definition such as "sunrise" or "sunset". Each mood may be triggered to activate on a periodic basis such as every day, or other defined, repeatable date and time combinations.

In an alternative embodiment, a mood may be activated through an external trigger connected to the system. An external trigger may be a motion sensor, audio sensor, infrared sensor, or any other sensor that may determine when a human being has entered a space for which a mood has been defined. The external trigger may be connected through either a wired or wireless connection to the system. As the human moves into the range of the sensor, triggering a response from the sensor to the master control unit, a defined mood is activated in the space.

Moods may be defined to be activated at any time within a twelve month timeframe. Moods may be triggered based upon alarms as well as sensors, such as, in a non-limiting example, a security system alarm. Additional trigger events may be defined as contact closures such as those that occur when opening a door or window. Any contact closure that indicates a transition from one state to another state may be associated with the system so as to activate a mood for the space in which the contact closure is detected.

In an exemplary implementation, a trigger may also be associated with an experience. Unlike a mood, which is defined for and assigned to a particular interior or exterior space, an experience is may load and execute a group of moods for a number of spaces simultaneously. In this fashion, an experience is capable of providing coordinated, designer, or disparate moods in a series of spaces to accommodate a user's design and plan for the spaces associated with an experience. In a non-limiting example, an experience may be defined to produce a party mood in interior or exterior spaces to which guests are to be entertained, and, simultaneously, produce a less-welcoming mood in spaces in which guests are to be discouraged from lingering. This type of experience may be defined by setting party moods in some spaces and less-welcoming moods in other spaces which are all associated with the experience. The experience may then be manually triggered by a user prior to the arrival of the first guest.

Alternatively, just as moods may be triggered by sensor or other activation signals, an experience may also be triggered by similar sensors or conditions. In a non-limiting example, a sensor may be associated with an experience that a user desires to trigger when they enter the space in which the sensor has been installed. The sensor would indicate to the system that a human has entered the space. The system would then activate the experience previously selected to be initiated upon the triggering of that particular sensor. Additionally, delays may be built into the definition of any mood or experience such that an activation signal from a sensor or other trigger may be subject to a previously input delay. The delay may be designed to permit a user to move from one space to another in an experience and have the experience be activated as the user arrives in the new space. Triggers and delays may be utilized to coordinate the activation and deactivation of moods and experiences in various spaces to enhance the user's use and enjoyment of the environment defined by the spaces.

In an embodiment, the primary benefits to the moods and experiences concept include simplification of use of a home automation system and the ability to control elements that are not electrically connected to each other and are located remotely from the master control unit to create a desired ambiance or environmental "feel". In the first instance, the action groups allow users to more efficiently execute multiple desired actions simultaneously. In the second instance, the ability to control "remote" elements, those that are not electrically connected to each other may include, in a non-limiting example, elements located in one physical location, such as a house or other building, and elements located in a second physical location, such as a detached garage, outbuilding, guard shack, or any other physical location. The control of disparate devices may be combined into a single mood for a particular space, or may be combined in several moods each of which may have elements in multiple physical locations to create an experience. An experience may be a static experience, where each mood for each defined space is activated and remains in the activated mood. Alternatively, an experience may be a dynamic experience, where triggers and defined time periods and delays may permit the moods in spaces to activate, deactivate, or change to different elements as the user enters, leaves, or moves about in the spaces associated with the experience.

Turning now to FIG. 1, this figure presents a view of a system component configuration consistent with certain embodiments of the present invention. In an exemplary embodiment, the master control unit 100 is a wired and wireless capable device that communicates with each device, circuit, database and component in the system. The master control unit 100 is responsible for configuration, control and management of the communication with and between each device in the system as well as setup, configuration, management, and control of all moods and experiences to be controlled by the system. In a non-limiting example, the master control unit 100 is displayed in a typical basic system configuration.

In this non-limiting example, the master control unit 100 receives communication signals from different devices that control segments of the home automation system. In this example, a wireless controller 104 is in communication with the master control unit 112 to receive command signals that may start and stop moods and experiences for the one or more spaces configured with the system installation. Moods and experiences may be triggered by a mobile device, computer, trigger, timer, light switch button presses, and other wireless means. Additionally, the master control unit 112 may be in wired or wireless communication with one or more physical elements installed within commercial or residential spaces 108.

In this exemplary embodiment, the master control unit 112 may be in wireless communication with a user through a mobile or handheld device such as, but not limited to, a mobile phone, iPad, tablet, network computer, laptop computer, or any other device configured with a display 104 to permit the user 100 to perform configuration tasks in communication with the master control unit 112. In a non-limiting example, the mobile or handheld device may be a tablet, smart phone or other wireless mobile device 104 that is in wireless communication with the master control unit 112. The tablet 104 has a display that permits the user to receive graphical menus and windows from which the user may enter data, make selections, initiate actions, and receive updates from the master control unit 112. The user may have complete control of the system configuration and operation from the tablet 104.

Figure 2:
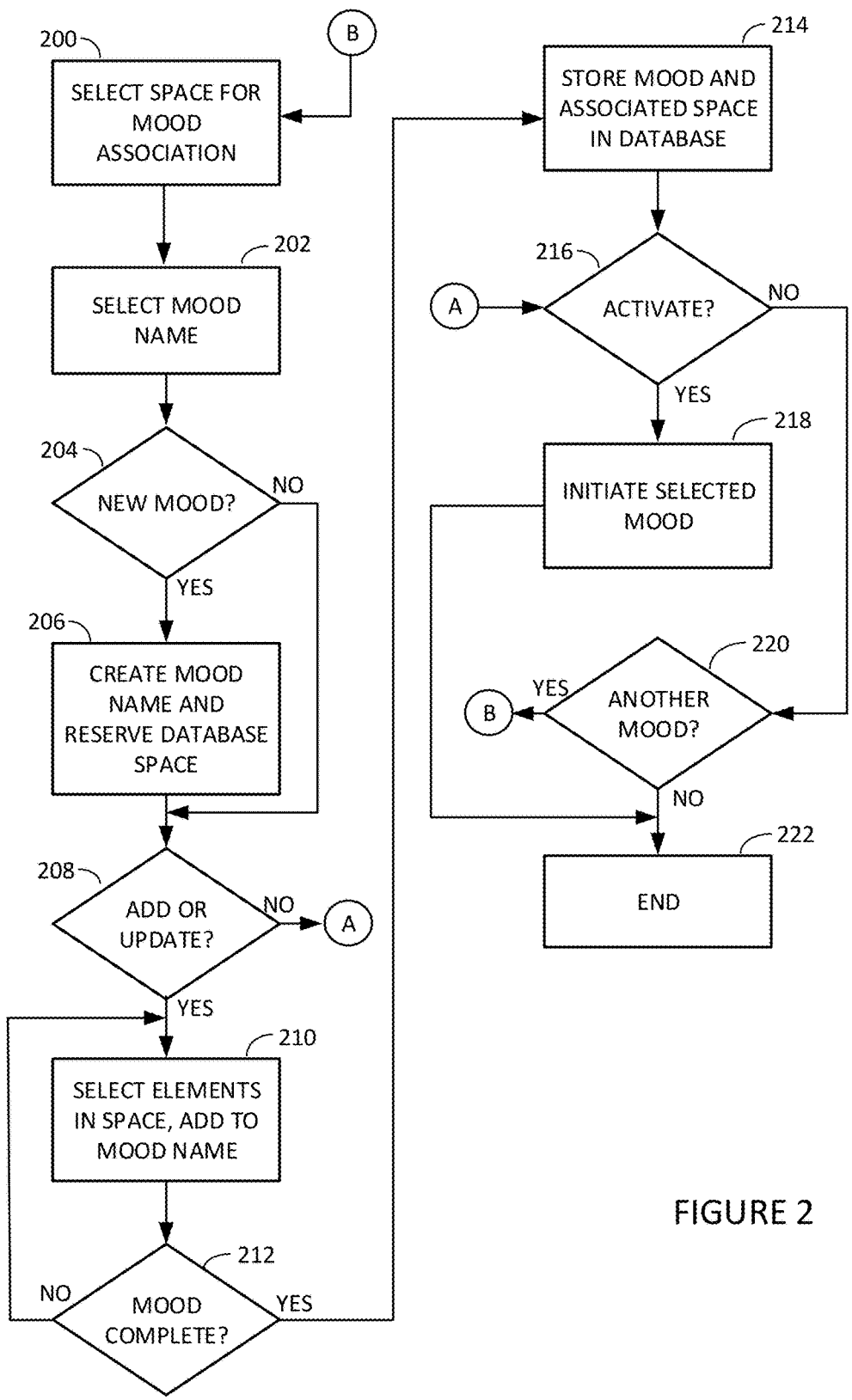
FIG. 2 is a view of a mood setup and configuration process consistent with certain embodiments of the present invention.

Turning now to FIG. 2, this figure presents a mood setup and configuration process consistent with certain embodiments of the present invention. In an exemplary embodiment, a mood configuration must include a space with which the mood settings for lighting, audio, climate, multimedia, security and any other settings that are to be activated as part of the mood are associated. To initiate the mood setup and configuration a user must select a space for the mood association 200. The system may present a mood name, or a user may input a mood name and select the name upon input 202. The master control unit may check the system database to determine if the mood name is a newly entered name, or is a mood name that is already contained in the system 204. If the mood name is a newly entered name, the master control unit will create and initialize the mood name in the database and reserve database space in which to enter mood information for the newly created mood name 206.

If the mood name is not new, but is already contained within the database, the master control unit may present the user with an option to add information to the mood name, or to update or modify the existing information associated with the mood name 208. If the user selects the update or modify option presented, the user will be prompted for the information to update or modify the mood name information. Each item of information and element that may be selected in the update or modify screen is associated with the space in which the mood is to be established. The user may then select elements within the space as represented by informational icons on a display screen and add the selected elements to the mood name 210. The system checks to determine whether the user has finished adding or modifying elements associated with the mood name 212. If the user has not finished, the system presents additional elements for the user to select 210, again permitting the user to add these elements to the mood name. If the user has completed updating the mood name, the system stores the defined mood in the database within the space reserved for the mood name selected or entered 214.

In this exemplary embodiment, if the user chooses not to add or modify the elements associated with the mood name, the system may permit the user to choose to activate the mood name 216 to create the mood within the space associated with the mood name by activating all of the elements associated with the mood name 218. If the user does not choose to activate the mood, the system may present the user with the option to select another mood name 220. If the user selects the option to process another mood, the process returns to step 200 to select the space associated with another mood name. If the user decides not to process another mood, the system ends the mood program 222.

Figure 3:
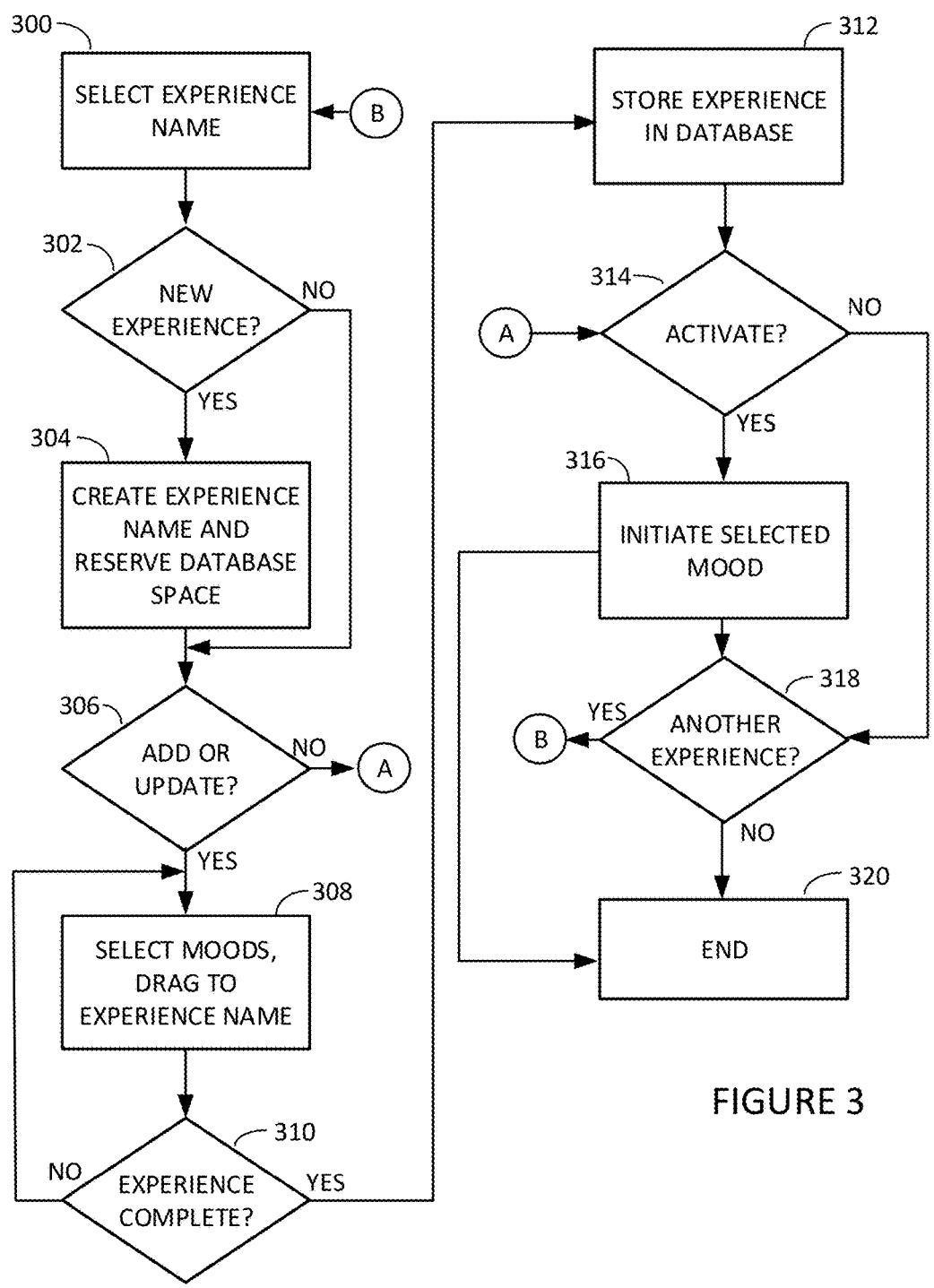
FIG. 3 is a view of an experience setup and configuration process consistent with certain embodiments of the present invention.

Turning now to FIG. 3, this figure presents a view of an experience setup and configuration process consistent with certain embodiments of the present invention. In an exemplary embodiment, the definition and setup of an experience requires the selection of a plurality of moods and spaces. The user may select the moods and spaces as presented on a display viewed either on a networked computer browser or on a mobile device display. To initiate the experience setup and configuration a user must enter or select an experience name 300. The system may present a mood name, or a user may input a mood name and select the name upon input. The master control unit may check the system database to determine if the experience name is a newly entered name, or is an experience name that is already contained in the system 302. If the experience name is a newly entered name, the master control unit will create and initialize the experience name in the database and reserve database space in which to enter experience information for the newly created experience name 304.

If the experience name is not new, but is already contained within the database, the master control unit may present the user with an option to add information to the experience name, or to update or modify the existing information associated with the experience name 306. If the user selects the update or modify option presented, the user will be prompted for the information to update or modify the experience name information. Each mood that may be selected in the update or modify screen is associated with the space in which the mood is to be established. The user may then select and drag the mood name, dropping the selected mood name on the experience name 308. The system checks to determine whether the user has finished adding or modifying elements associated with the experience name 310. If the user has not finished, the system presents additional moods for the user to select 308, again permitting the user to drag and drop these moods on the experience name. If the user has completed updating the experience name, the system stores the defined experience in the database within the space reserved for the experience name selected or entered 312.

In this exemplary embodiment, if the user chooses not to add moods associated with the experience name, the system may permit the user to choose to activate the experience 314 to create the experience within the spaces associated with the experience name by activating all of the moods associated with the experience name 316. If the user does not choose to activate the experience, the system may present the user with the option to select another experience name 318. If the user selects the option to process another experience, the process returns to step 300 to select another experience name. If the user decides not to process another experience, the system ends the experience setup and configure program 320.

Figure 4:
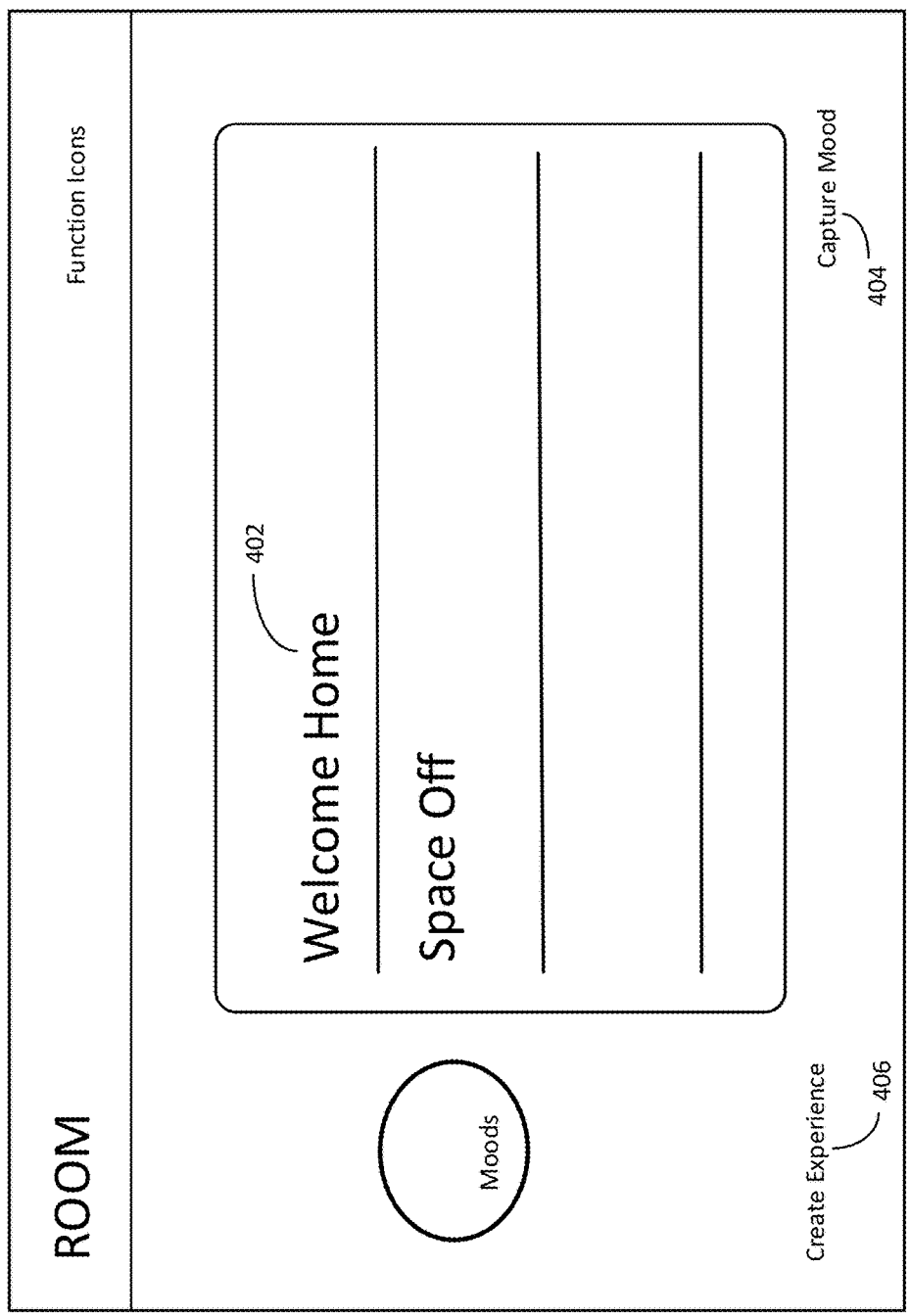
FIG. 4 is a view of a mood setup and capture screen consistent with certain embodiments of the present invention.

Turning now to FIG. 4, this figure presents a scheduled mood selection menu consistent with certain embodiments of the present invention. In this embodiment, the system may present a user with an exemplary indication of the moods display 400. The moods display 400 may present a user with a list of all of the named moods 402 that have been defined and stored within the system. A user may choose to select a mood from the list 402 for activation, or the user may choose to capture a new mood to add to the list by selecting the capture mood icon 404. Alternatively, the user may choose to create an experience by selecting the create experience icon 406.

Figure 5:
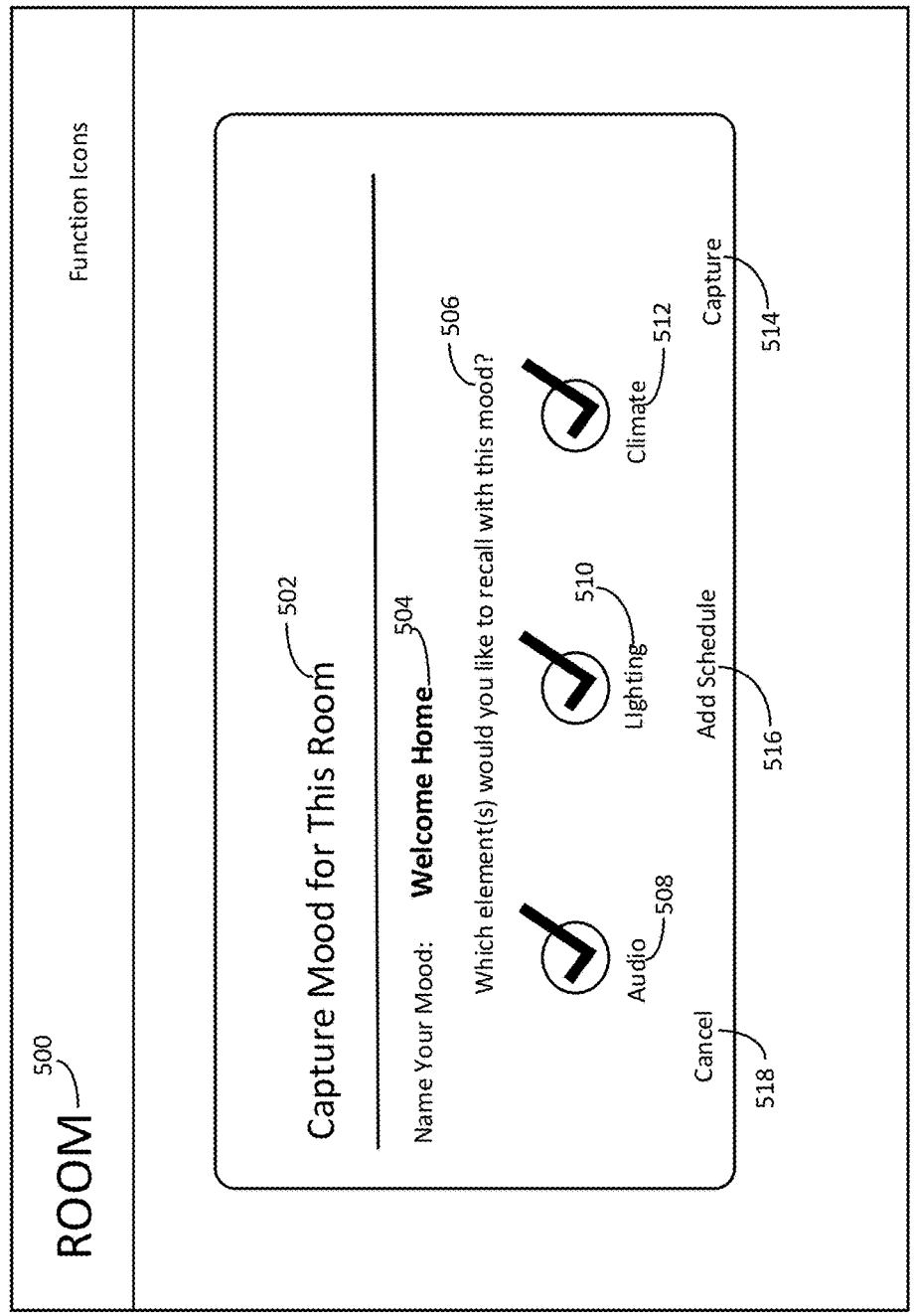
FIG. 5 is a view of a mood timing schedule setup consistent with certain embodiments of the present invention.

Turning now to FIG. 5, this figure presents a mood setup and capture screen consistent with certain embodiments of the present invention. In an exemplary embodiment, a user may select a space, as represented by the ROOM name icon 500, in which to associated elements that will form the mood for the selected space. The user is prompted to capture the mood for the particular space 502. The user may then enter the name of the mood that they either wish to create or recall from the database for modification and/or update 504. The user is also prompted to select the elements that are to be associated with the named mood 506. The user may select from broad categories of elements such as Audio 508, Lighting 510, and Climate 512. The user selects the category of element by placing a check mark in the selection area on the screen for each category of element selected. The user may then capture 514 the elements to be added to the mood 514, or proceed to add scheduled 516 dates, times, and/or triggers to schedule the activation of the mood associated with the selected space and mood name. If the user decides against updating or modifying the mood name entered, they may simply select cancel 518 to return to a previous screen display.

Figure 6:
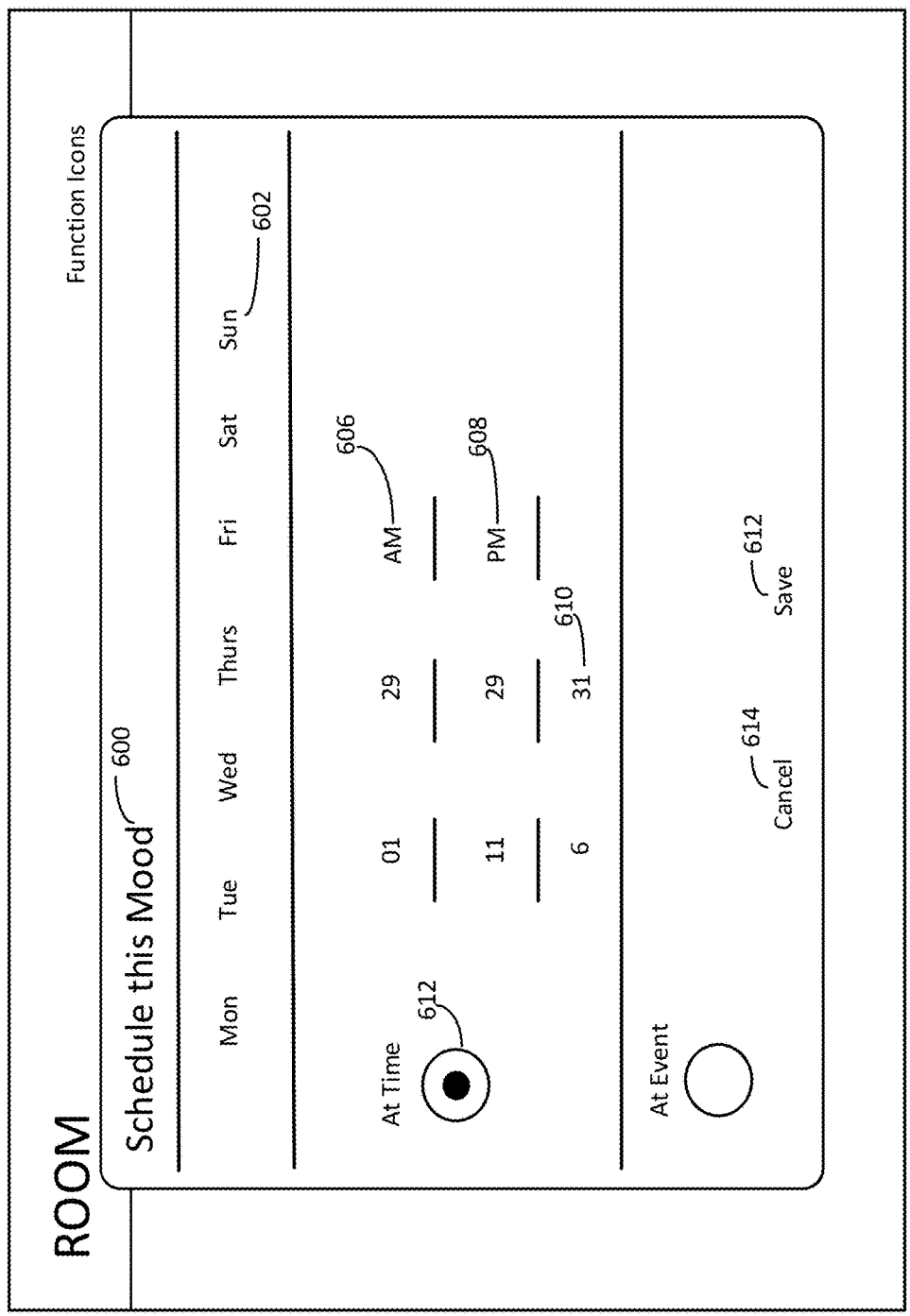
FIG. 6 is a view of a mood event scheduling setup consistent with certain embodiments of the present invention.

Turning now to FIG. 6, this figure presents a mood timing schedule setup consistent with certain embodiments of the present invention. In this embodiment, upon selection of the Add Schedule option on the capture mood screen display, the user is presented with the schedule mood screen display 600. The user may select the day of the week 602 for which the mood is to be activated. The user is also presented with time and trigger options. In this exemplary display, the user has selected the "At Time" icon selection 604, which permits the user to enter time and date information for the activation of the mood.

The user may select a start time 606 and designate whether this time is in the morning or the afternoon. The user may also select an end time 608 and designate whether this time is in the morning or the afternoon. In an alternative embodiment, the user may choose to use a 24 hour clock to enter the time information. The user may also enter the month and day information for which the mood is to be activated 610.

The user may then select the save icon 612 to indicate that the time and date information should be added to the database information associated with this mood. Alternatively, if the information is incorrect, or the user decides not to set a time activation for the mood, the user may select the cancel icon 614 to erase the entered information and return the user to the previous display.

Figure 7:
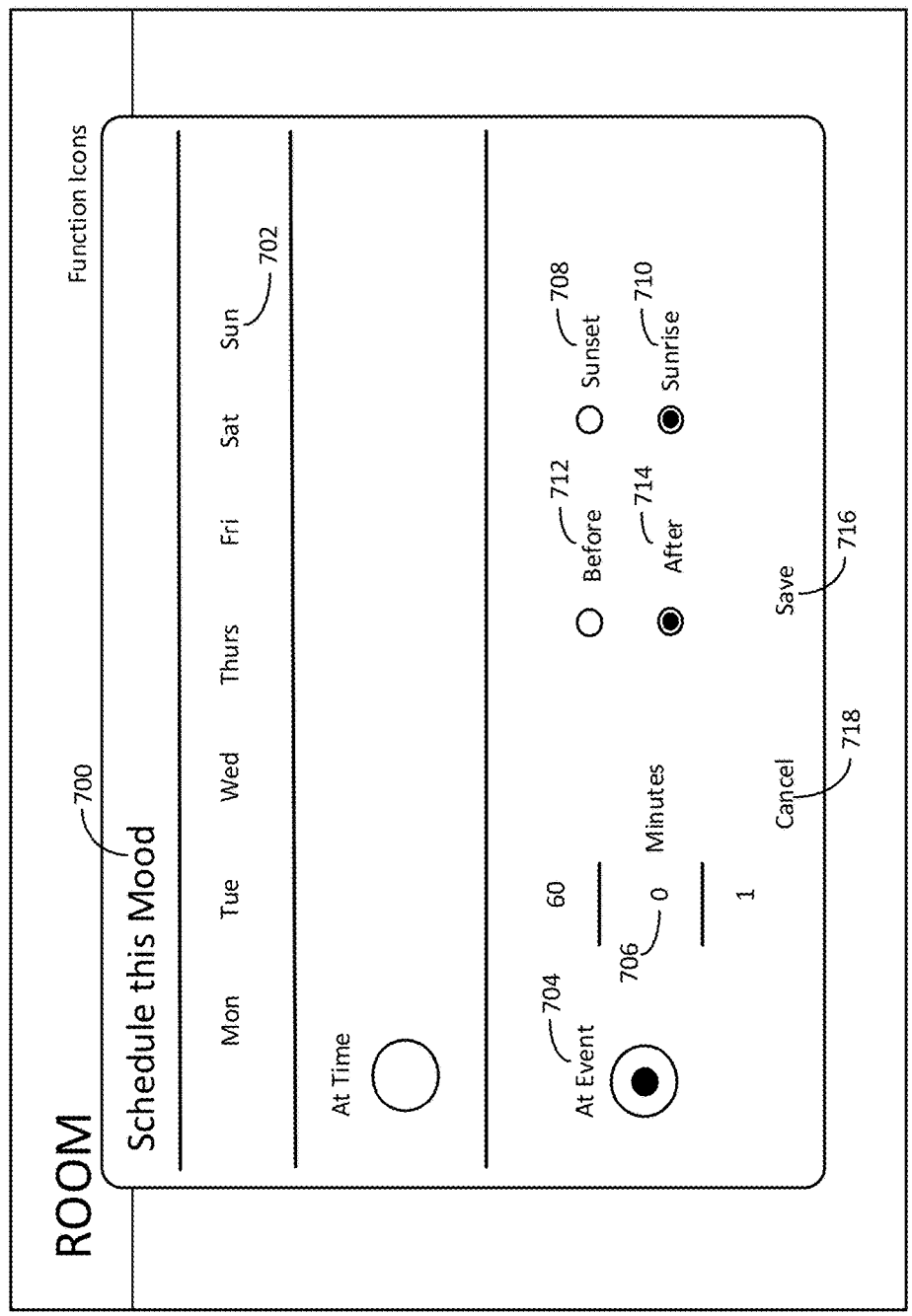
FIG. 7 is a view of a scheduled mood selection menu consistent with certain embodiments of the present invention.

Turning now to FIG. 7, this figure presents a mood event scheduling setup consistent with certain embodiments of the present invention. In this embodiment, while the user is presented with the Schedule this Mood display 700, the user may choose to set a trigger for the activation of a mood. The user may select a day of the week 702 for the activation of the mood. The "At Event" icon selection 704 permits the user to enter time information for the activation of the mood. The time setting may be designed as a rotary function permitting the user to select the time by rotating the center selection up or down to present different numbers as time associated with the trigger action. In a non-limiting example, the rotary selection is set to display in minutes 706. However, other time segments and designations may be equally implemented in this display.

Trigger events may be any reproducible or recurring event the system may detect and, upon detection, trigger the activation of the mood. In this non-limiting example, two events, sunset 708 and sunrise 710, are presented to the user for selection by clicking on the radio dial associated with each trigger. Additionally, trigger modifiers, before 712 and after 714, are provided for the user to permit the further modification of the trigger event and timing of the activation.

The user may select a trigger event such as Sunrise 710, a trigger modifier, such as After 714, and select a time associated with the trigger, such as 0 minutes 706. This series of selections may set a trigger for the mood to be activated 0 minutes after sunrise on a day of the user's choosing, or every day if the user so chooses. The trigger event presented should in no way be considered limiting as many different types of trigger events and timing parameters may be defined and used without departing from the invention.

The user may then select the save icon 716 to indicate that the trigger information should be added to the database information associated with this mood. Alternatively, if the information is incorrect, or the user decides not to set a trigger activation for the mood, the user may select the cancel icon 718 to erase the entered information and return the user to the previous display.

Figure 8:
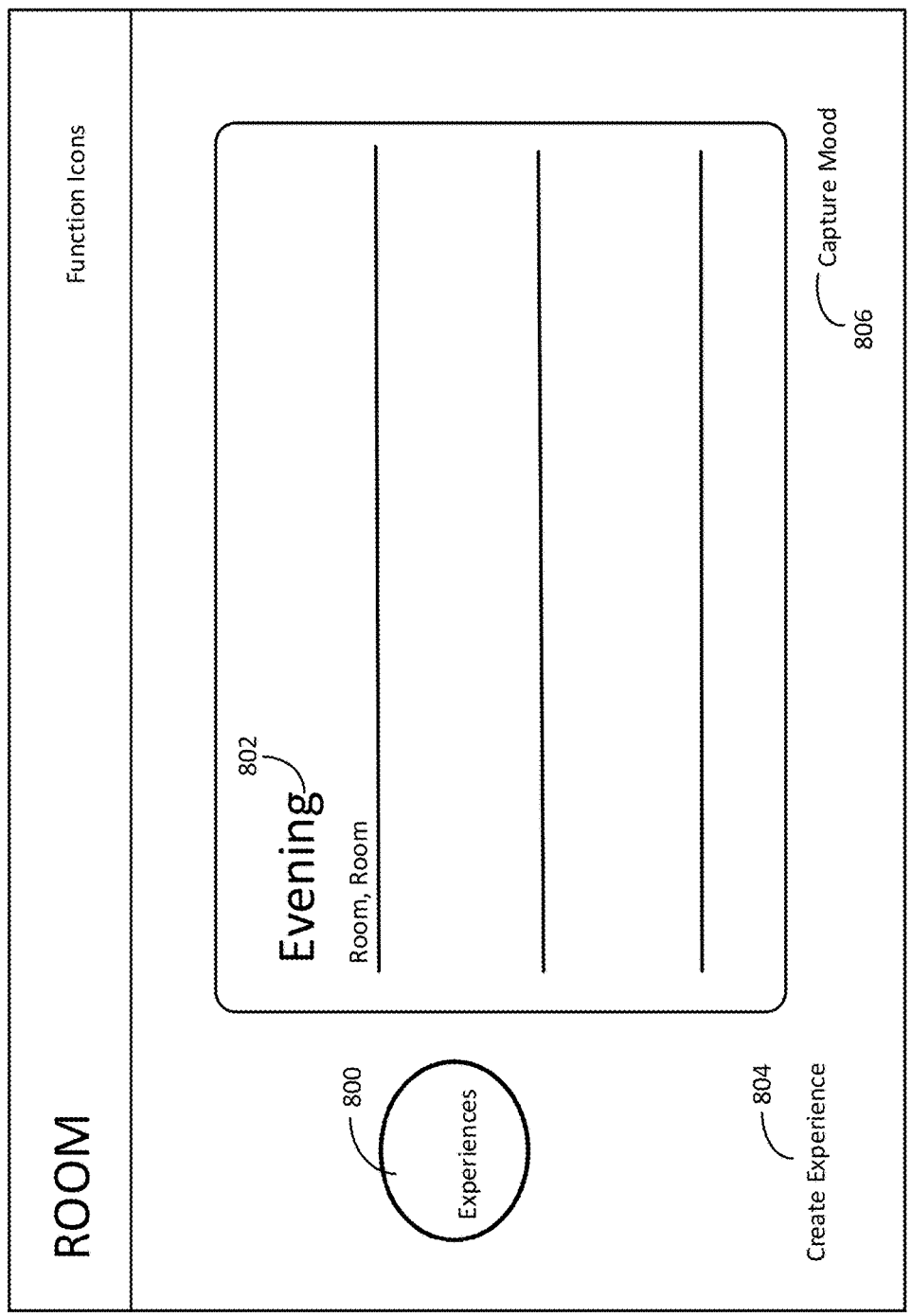
FIG. 8 is a view of an experience setup and capture screen consistent with certain embodiments of the present invention.

Turning now to FIG. 8, this figure presents a scheduled mood selection menu consistent with certain embodiments of the present invention. In this embodiment, the system may present a user with an exemplary indication of the experiences display 800 for a given space. The experiences display 800 may present a user with a list of all of the named experiences 802 that have been defined and stored within the system. A user may choose to select an experience from the list 802 for activation, or the user may choose to create a new experience to add to the list by selecting the create experience icon 804. Alternatively, the user may choose to capture a mood by selecting the capture mood icon 806.

Figure 9:
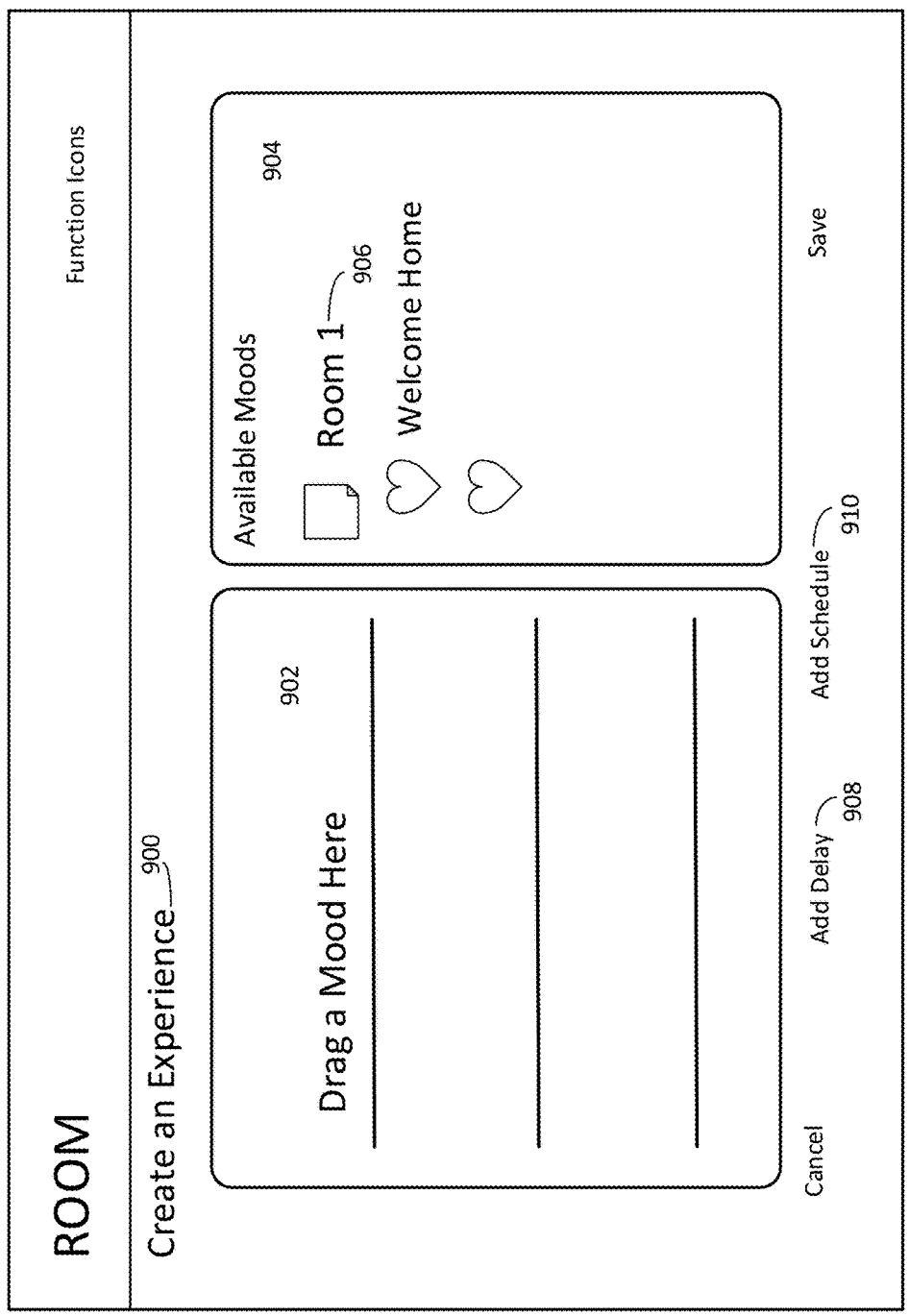
FIG. 9 is a view of an experience schedule setup consistent with certain embodiments of the present invention.

Turning now to FIG. 9, this figure presents an experience schedule setup consistent with certain embodiments of the present invention. In an exemplary embodiment, an experience is a collection of moods that can be defined and/or activated through the use of a mobile application on a mobile device. The experience may also be activated through a button press on a light switch or may be defined to be activated at a designated date and time. In this exemplary embodiment, upon the selection of the create experience icon from a computer browser or mobile device display, the user is presented with the Create an Experience display 900. The user is presented with a list of moods 902 that have been, or may be, defined for use with the named experience. The user is also presented with a list of available moods 904 that may be selected for association with the named experience.

In an embodiment, a user may select the name of a mood 906 from the list of available moods 904. The mood 906 may then be dragged to the list of moods 902 section of the screen display and the mood dropped into the existing list of moods 902. If a list of moods 902 does not currently exist for the experience, dropping the named mood 906 onto the list of moods 902 is sufficient to create the experience in the system and attach the named mood 906 to the newly created experience.

If the user is satisfied with the moods 906 added to the experience, the user may select the save icon 912 to commit the updates, additions and changes to the database associated with the experience. If, however, the user does not want to save the information entered, the user may select the cancel icon 914 to remove the updates, additions and changes and return to the previous screen display.

Figure 10:
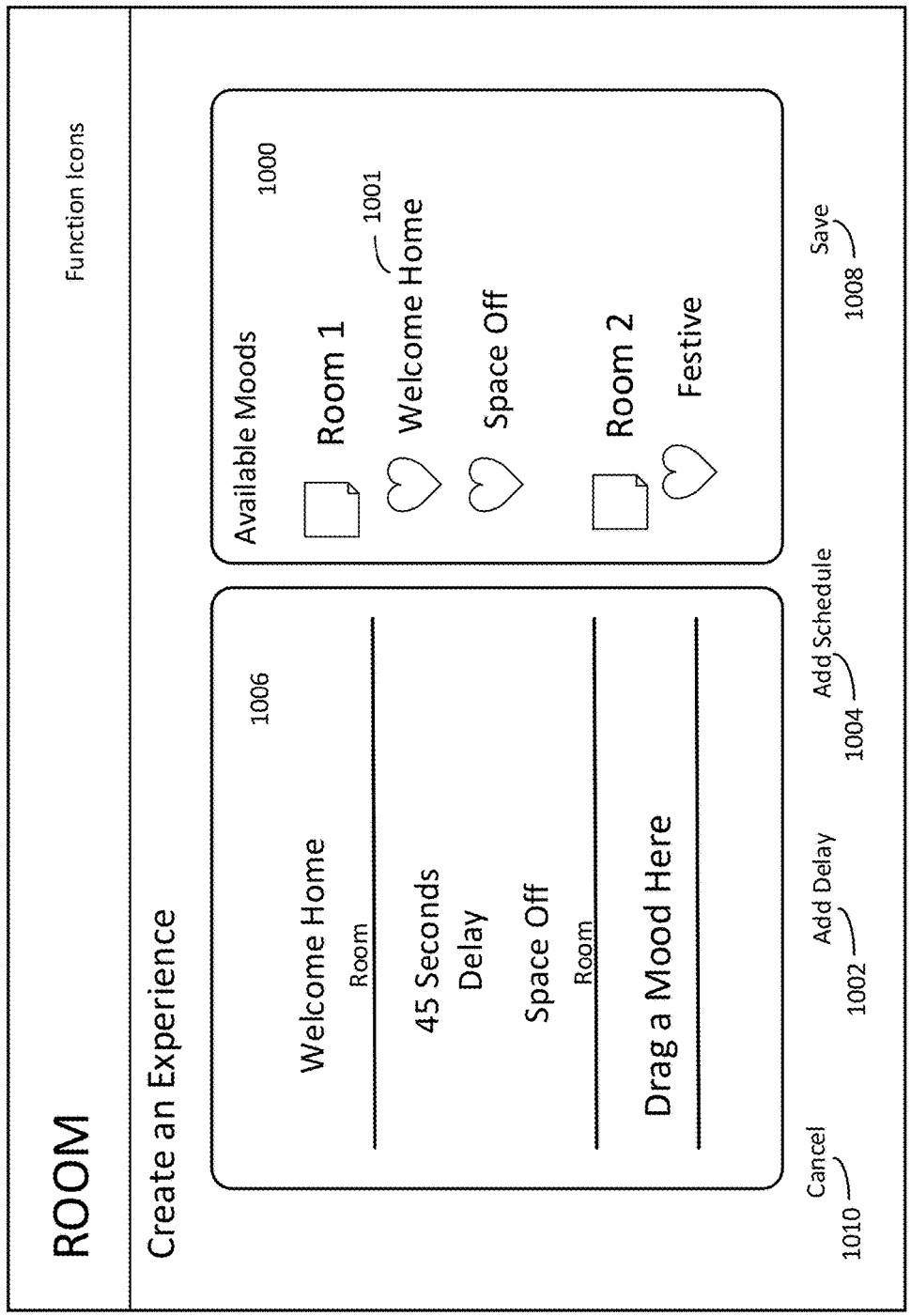
FIG. 10 is a view of a scheduled experience selection menu consistent with certain embodiments of the present invention.

Turning now to FIG. 10, this figure presents a scheduled experience selection menu consistent with certain embodiments of the present invention. In an embodiment, the user may be presented with a plurality of moods 1000 that have been defined for particular spaces, permitting the user to select one or more of the moods 1000 for inclusion in the experience. In this embodiment, the user may also add scheduled timing 1002 and trigger events 1004 to the experience.

In a non-limiting example, the user may select the Welcome Home mood 1001 and drag the Welcome Home mood 1001 over to the experience list 1006. The Welcome Home mood 1001 will be expanded by the system to present the user with any information about timing 1002 or triggers 1004 that have been previously established for the Welcome Home mood 1001. Timing 1002 and triggers 1004 may be established for each mood within the experience as was previously described above.

If the user is satisfied with the moods 1000, timing 1002 and triggers 1004 added to the experience, the user may select the save icon 1008 to commit the updates, additions and changes to the database associated with the experience. If, however, the user does not want to save the information entered, the user may select the cancel icon 1010 to remove the updates, additions and changes and return to the previous screen display.

While certain illustrative embodiments have been described, it is evident that many alternatives, modifications, permutations and variations will become apparent to those skilled in the art in light of the foregoing description.

What is claimed is:

1. A system, comprising: a processor receiving instructions from a wireless mobile device capturing a state of lighting, audio, multimedia, environmental, and security elements that contribute to a particular ambient mood in a particular defined physical space;
   assigning one or more of the particular ambient moods to one or more ambient mood identifiers;
   associating each of the ambient mood identifiers with a trigger, where said trigger is in wireless communication with the processor and configured to affect the state of lighting, audio, multimedia, environmental, and security elements in each of the particular defined physical space;
   activating each of the particular ambient mood in each of the particular defined physical space by selecting the trigger associated with the ambient mood identifier or by setting a timer to select the trigger at a pre-determined time;
   aggregating a plurality of the particular ambient moods into an experience aggregation and associating the experience aggregation with a single trigger;
   and coordinating the aggregated plurality of the particular ambient moods within the experience aggregation to direct or enhance user environmental interaction of the of the state of lighting, audio, multimedia, environmental, and security elements of the particular defined physical space.

2. The system of claim 1, further comprising permitting a user to select particular elements to associate with a defined physical space, and permitting a user to update a list of elements associated with a defined physical space.

3. The system of claim 1, where the elements comprise any of lighting, audio, multimedia displays, sensors, thermostats, or any other physical device or system that may contribute to an ambient experience in a defined physical space.

4. The system of claim 1, where a user selects multiple identifiers to associate with a single trigger to activate all elements simultaneously.

5. The system of claim 1, where a timer is assigned to a date and time of day.

6. The system of claim 1, where a user associates an event with a trigger.

7. The system of claim 6, where an event may be a time of day, a day of the year, a pre-scheduled gathering, or any other event having a pre-set date and time.

8. The system of claim 1, where aggregating a plurality of particular ambient experiences is associated with a plurality of physical spaces.

9. The system of claim 8, where an aggregation of a plurality of particular ambient experiences is associated with a single label.

10. A method of initiating a defined ambiance, comprising:
    a mobile device wirelessly transmitting instructions from said wireless mobile device and capturing a state of all lighting, audio, multimedia, environmental, and security elements that contribute to a particular ambient mood experience in a particular defined physical space;
    assigning one or more of the particular ambient moods to one or more ambient mood identifiers;
    associating each of the ambient mood identifier with a trigger, where said trigger is in wireless communication with a system processor and configured to affect the state of lighting, audio, multimedia, environmental, and security elements in each of the particular defined physical space;

activating each of the particular ambient mood in each of the particular defined physical space by selecting the trigger associated with the ambient mood identifier or by setting a to select the trigger at a pre-determined time;

aggregating a plurality of the particular ambient moods into an experience aggregation and associating the aggregation with a single trigger; and coordinating the the plurality of the particular ambient moods within the experience aggregation to direct or enhance user environmental interaction of the state of lighting, audio, multimedia, environmental, and security elements of the particular defined physical space.

11. The method of claim 10, further comprising permitting a user to select particular elements to associate with a defined physical space, and permitting a user to update a list of elements associated with a defined physical space.

12. The method of claim 10, where the elements comprise any of lighting, audio, multimedia displays, sensors, thermostats, or any other physical device or system that may contribute to an ambient experience in a defined physical space.

13. The method of claim 10, where a user selects multiple identifiers to associate with a single trigger to activate all elements simultaneously.

14. The method of claim 10, where a timer is assigned to a date and time of day.

15. The method of claim 10, where a user associates an event with a trigger.

16. The method of claim 15, where an event may be a time of day, a day of the year, a pre-scheduled gathering, or any other event having a pre-set date and time.

17. The method of claim 10, where aggregating a plurality of particular ambient experiences is associated with a plurality of physical spaces.

18. The method of claim 17, where an aggregation of a plurality of particular ambient experiences is associated with a single label.

* * * * *